(12) United States Patent
Kajita et al.

(10) Patent No.: US 8,063,167 B2
(45) Date of Patent: Nov. 22, 2011

(54) OPTICAL POLYURETHANE RESIN COMPOSITION AND OPTICAL POLYURETHANE RESIN

(75) Inventors: Yasuyuki Kajita, Chiba (JP); Hirofumi Morita, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 76 days.

(21) Appl. No.: 12/312,588

(22) PCT Filed: Nov. 12, 2007

(86) PCT No.: PCT/JP2007/071929
§ 371 (c)(1),
(2), (4) Date: May 18, 2009

(87) PCT Pub. No.: WO2008/059796
PCT Pub. Date: May 22, 2008

(65) Prior Publication Data
US 2010/0056746 A1    Mar. 4, 2010

(30) Foreign Application Priority Data
Nov. 17, 2006    (JP) .................................. 2006-311752

(51) Int. Cl.
*C08G 18/74*    (2006.01)
(52) U.S. Cl. ........................................................ 528/65
(58) Field of Classification Search .................... None
See application file for complete search history.

(56) References Cited

U.S. PATENT DOCUMENTS

| | | | | | |
|---|---|---|---|---|---|
| 4,080,318 | A | * | 3/1978 | Smith et al. ..................... | 528/80 |
| 5,140,089 | A | * | 8/1992 | Muhlfeld et al. ............... | 528/60 |
| 2002/0068809 | A1 | | 6/2002 | Tamura et al. | |
| 2004/0116646 | A1 | * | 6/2004 | Choi et al. ....................... | 528/66 |

FOREIGN PATENT DOCUMENTS

| | | |
|---|---|---|
| JP | 2000-178336 | 6/2000 |
| JP | 2002-187931 | 7/2002 |
| JP | 2005-132934 | 5/2005 |

OTHER PUBLICATIONS

Perstop Sales brochure, Caprolactone data sheet p. 11.*

* cited by examiner

*Primary Examiner* — Randy Gulakowski
*Assistant Examiner* — Jeffrey Washville
(74) *Attorney, Agent, or Firm* — Foley & Lardner LLP

(57) ABSTRACT

An optical polyurethane resin composition contains a polyisocyanate component including at least one cyclic polyisocyanate selected from the group consisting of alicyclic polyisocyanates, aralkyl polyisocyanates, and modified compounds thereof; and a polyol component having an average hydroxyl value of 280 to 1240 mg KOH/g and an average functionality of more than 2 and less than 5.

3 Claims, No Drawings

OPTICAL POLYURETHANE RESIN COMPOSITION AND OPTICAL POLYURETHANE RESIN

TECHNICAL FIELD

The present invention relates to optical polyurethane resin compositions and optical polyurethane resins, and more particularly to an optical polyurethane resin suitable for optical lenses and optical components, and an optical polyurethane resin composition which is a raw material for producing the optical polyurethane resin.

BACKGROUND ART

Casting polyurethane formed by a prepolymer method or a one-shot method is excellent in mechanical properties such as wear resistance and impact resistance, and is used for various industrial applications in the form of industrial products such as rolls and belts.

On the other hand, optical applications such as optical lenses and optical components recently require not only excellent optical characteristics but also outstanding mechanical properties such as impact resistance. Therefore, the use of casting polyurethane for optical applications is considered.

There have been proposed a polyurethane resin composition for casting prepared from a polyisocyanate selected from 4,4'-methylene-bis(cyclohexyl isocyanate) or isophorone diisocyanate, a polyhydroxy compound selected from a polyether diol or a polyester diol having an average molecular weight of 700 to 1200 or their mixture, and an aromatic polyamine made of 4,4'-methylene-bis(2-chloroaniline); and an impact-resistant optical lens formed by casting the polyurethane resin composition for casting (see, for example, the following Patent Document 1).

Patent Document 1: Japanese Unexamined Patent Publication No. 2002-187931

DISCLOSURE OF THE INVENTION

Problems to be Solved

However, since the polyurethane resin composition for casting described in Patent Document 1 uses an aromatic polyamine, more specifically, 4,4'-methylene-bis(2-chloroaniline), the injection time (pot life) during production is short, which disadvantageously causes striae to occur in the impact-resistant optical lens obtained by casting.

Therefore, the impact-resistant optical lens described in Patent Document 1 cannot satisfy a practical level of requirements on optical characteristics such as color tone and striae, and there have been desired further improvement of optical characteristics and development of optical polyurethane resin having excellent mechanical properties.

It is an object of the present invention to provide an optical polyurethane resin which satisfies a practical level of optical characteristics and is excellent in various physical properties such as heat resistance and impact resistance, and an optical polyurethane resin composition which is a raw material for producing the optical polyurethane resin.

Means for Solving the Problem

To achieve the above object, the optical polyurethane resin composition of the present invention contains a polyisocyanate component including at least one cyclic polyisocyanate selected from the group consisting of alicyclic polyisocyanates, aralkyl polyisocyanates, and modified compounds thereof; and a polyol component having an average hydroxyl value of 280 to 1240 mg KOH/g and an average functionality of more than 2 and less than 5.

Moreover, in the optical polyurethane resin composition of the present invention, it is preferable that the polyol component contains a crosslinking polyol having an average hydroxyl value of 150 to 1300 mg KOH/g and an average functionality of 2.5 or more and 5 or less.

Moreover, in the optical polyurethane resin composition of the present invention, it is preferable that the polyol component further contains a glycol having an average hydroxyl value of 70 to 500 mg KOH/g, and that the glycol contains a polytetramethylene ether glycol.

Moreover, it is preferable that the optical polyurethane resin composition of the present invention is adjusted so that an optical polyurethane resin obtained by a reaction of the polyisocyanate component and the polyol component has an average molecular weight between crosslinking points in a range of 150 to 400.

Moreover, the present invention includes an optical polyurethane resin obtained from the above-mentioned optical polyurethane resin composition by allowing the polyisocyanate component and the polyol component to react.

Moreover, it is preferable that the optical polyurethane resin composition of the present invention has a haze value of 0.5 or less.

Effect of the Invention

The optical polyurethane resin produced by the optical polyurethane resin composition according to the present invention has a long pot life during molding, which therefore is excellent in optical characteristics such as transparency, color tone, and striae, and moreover, has outstanding mechanical properties such as heat resistance and impact resistance. Accordingly, the optical polyurethane resin can be suitably used for optical lenses such as transparent lenses, sunglass lenses, and polarizing lenses; and optical components such as protective glasses, hoods, protective shields, automotive safety components, and lighting components.

EMBODIMENT OF THE INVENTION

The optical polyurethane resin composition of the present invention contains a polyisocyanate component and a polyol component.

In the present invention, the polyisocyanate component contains at least one cyclic polyisocyanate selected from the group consisting of alicyclic polyisocyanates, aralkyl polyisocyanates, and modified compounds thereof.

Examples of the alicyclic polyisocyanate include alicyclic diisocyanates such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (IPDI), 4,4'-methylenebis(cyclohexyl isocyanate) ($H_{12}$MDI), methyl-2,4-cyclohexane diisocyanate, methyl-2,6-cyclohexane diisocyanate, 1,3- or 1,4-bis(isocyanatomethyl)cyclohexane ($H_6$XDI) or mixtures thereof, and bis(isocyanatomethyl)norbornane (NBDI).

Examples of the aralkyl polyisocyanate include aralkyl diisocyanates such as 1,3- or 1,4-xylylene diisocyanate (XDI) or mixtures thereof, and tetramethyl xylylene diisocyanate (TMXDI).

Examples of the modified compounds of the alicyclic polyisocyanate and/or the aralkyl polyisocyanate include derivatives thereof such as dimers, trimers, biurets, allophanates, carbodiimides, uretdiones, and oxadiazinetriones from the alicyclic polyisocyanates and/or the aralkyl polyisocyanates. Further, examples thereof include polyol adducts obtained by allowing the alicyclic polyisocyanate, the aralkyl polyisocyanate, and/or derivatives thereof to react with a low-molecular-weight polyol at an equivalent ratio at which an isocyanate group thereof exceeds a hydroxyl group of the low-molecular-weight polyol.

Examples of the low-molecular-weight polyol include low-molecular-weight diols such as ethylene glycol, propanediol, 1,4-butylene glycol, 1,3-butylene glycol, 1,2-butylene glycol, 1,6-hexanediol, neopentyl glycol, alkane (C7-C22) diol, diethylene glycol, triethylene glycol, dipropylene glycol, cyclohexane dimethanol, alkane-1,2-diol (C17-C20), bisphenol-A, hydrogenated bisphenol-A, 1,4-dihydroxy-2-butene, 2,6-dimethyl-1-octene-3,8-diol, bishydroxyethoxy benzene, xylene glycol, and bishydroxyethylene terephthalate; low-molecular-weight triols such as glycerin, 2-methyl-2-hydroxymethyl-1,3-propanediol, 2,4-dihydroxy-3-hydroxymethylpentane, 1,2,6-hexanetriol, 1,1,1-tris(hydroxymethyl)propane (trimethylolpropane), 2,2-bis(hydroxymethyl)-3-butanol and other aliphatic triols (C8-C24); and low-molecular-weight polyols having four or more hydroxyl groups such as tetramethylolmethane, pentaerythritol, D-sorbitol, xylitol, D-mannitol, D-mannite, and sucrose.

These cyclic polyisocyanates can be used alone or in combination of two or more kinds. Among them, an alicyclic polyisocyanate and/or a modified compounds thereof is/are preferable, an alicyclic polyisocyanate is more preferable, or IPDI, $H_{12}$MDI, $H_6$XDI, and NBDI are even more preferable.

Although additives to be described later or the like are mixed with the polyisocyanate component according to the purposes and applications, the above-mentioned cyclic polyisocyanate is substantially contained as a main component.

In the present invention, the polyol component contains one kind or two or more kinds of polyols (hydroxyl group-containing compounds having two or more hydroxyl groups), having an average hydroxyl value of 280 to 1240 mg KOH/g, or preferably 400 to 940 mg KOH/g, and an average functionality of more than 2, preferably more than 2.5, or even preferably more than 2.8, and less than 5, or preferably less than 4.5.

The average hydroxyl value can be determined by known titration methods, and the hydroxyl value and the hydroxyl equivalent satisfy the relation of the following equation (1):

Hydroxyl value=56100/hydroxyl equivalent    (1)

The average functionality can be determined by the following equation (2):

Average functionality=sum of (functionality of each polyol×number of equivalents)/sum of the number of equivalents of each polyol)    (2)

If the average hydroxyl value is higher than this value, impact resistance may be decreased, and if lower than this value, heat resistance may be deteriorated. Moreover, if the average functionality is lower than this value, heat resistance may be deteriorated, and if higher than this value, impact resistance may be decreased.

The number average molecular weight of the polyol component is in the range of, for example, 90 to 1000, or preferably 100 to 800.

The polyol component preferably contains a crosslinking polyol.

In the present invention, the crosslinking polyol is a hydroxyl group-containing compound having an average hydroxyl value of 150 to 1300 mg KOH/g, or preferably 250 to 1000 mg KOH/g, and an average functionality of 2.5 or more, or preferably 3 or more, and 5 or less, or preferably 4.8 or less. If the average hydroxyl value is higher than this range, impact resistance may be decreased, and if lower than this range, heat resistance may be deteriorated. Moreover, if the average functionality is lower than this range, heat resistance may be deteriorated, and if higher than this range, impact resistance may be decreased.

Examples of the crosslinking polyol include macropolyols such as polyether polyol, polyester polyol, polycarbonate polyol, acrylic polyol, epoxy polyol, natural oil polyol, silicone polyol, fluorine polyol, and polyolefine polyol. These macropolyols can be used alone or in combination of two or more kinds. Among them, polyether polyol and polyester polyol are preferable.

Examples of the polyether polyol include polyoxy-C2-C3-alkylene (ethylene and/or propylene) polyols, such as polyethylene polyol, polypropylene polyol, and/or polyethylene polypropylene polyol (random or block copolymer), which are obtained by appropriately combining the above-mentioned low-molecular-weight glycol, low-molecular-weight triol, and low-molecular-weight polyol having 4 or more hydroxyl groups so as to have the above-mentioned average functionality, and conducting addition reaction of alkylene oxide such as ethyleneoxide and/or propylene oxide using the combined low-molecular-weight polyol as an initiator.

Preferred examples of the polyether polyol include polypropylene polyol and/or polyethylene polypropylene polyol (random or block copolymer). The use of polypropylene polyol and/or polyethylene polypropylene polyol (random or block copolymer) may reduce crystallinity, so that transparency can be improved.

Examples of the polyester polyol include polyester polyols obtained by reaction of polyalcohol obtained by appropriately combining the above-mentioned low-molecular-weight glycol, low-molecular-weight triol, and low-molecular-weight polyol having 4 or more hydroxyl groups so as to have the above-mentioned average functionality, with polybasic acid or its acid anhydride, or its acid halide.

Examples of the polybasic acid and its acid anhydride or its acid halide include carboxylic acid such as oxalic acid, malonic acid, succinic acid, methyl succinic acid, glutaric acid, adipic acid, 1,1-dimethyl-1,3-dicarboxypropane, 3-methyl-3-ethyl glutaric acid, azelaic acid, sebacic acid, other aliphatic dicarboxylic acids (C11-C13), hydrogenated dimer acid, maleic acid, fumaric acid, itaconic acid, orthophthalic acid, isophthalic acid, terephthalic acid, toluene dicarboxylic acid, dimer acid and HET acid; and acid anhydride derived from these carboxylic acids, such as oxalic anhydride, succinic anhydride, maleic anhydride, phthalic anhydride, 2-alkyl (C12-C18) succinic anhydride, tetrahydrophtalic anhydride and trimellitic anhydride; and also acid halide derived from these carboxylic acids such as oxalic dichloride, adipic dichloride and sebacic dichloride.

Further, examples of the polyester polyol include lactone polyester polyols such as polycaprolactone polyol and polyvalerolactone polyol, which are obtained by, for example, appropriately combining the above-mentioned low-molecular-weight glycol, low-molecular-weight triol, and low-molecular-weight polyol having 4 or more hydroxyl groups so as to have the above-mentioned average functionality, and ring-opening polymerizing lactones such as ε-caprolactone and γ-valerolactone using the combined low-molecular-weight polyol as an initiator.

Preferred examples of the polyester polyol include lactone polyester polyols. Using a lactone polyester polyol, it will be easy to control the average functionality, and heat resistance and impact resistance can be well-balanced.

These polyether polyols and polyester polyols can be used alone or in combination of two or more kinds.

The crosslinking polyol is contained in an amount of, for example, 50 to 100 parts by weight, or preferably 70 to 100 parts by weight, in 100 parts by weight of the polyol component.

In the present invention, it is preferable that the polyol component further contains glycol. If the polyol component contains glycol, impact resistance can be improved.

In the present invention, glycol is a hydroxyl group-containing compound having an average hydroxyl value of 70 to 500 mg KOH/g or preferably 150 to 450 mg KOH/g, and an average functionality of substantially 2. If the average hydroxyl value is lower than this range, heat resistance may be deteriorated, and if higher than this range, impact resistance may be decreased.

Examples of the glycol include macrodiols such as polyether diol, polyester diol, polycarbonate diol, acrylic diol, epoxy diol, natural oil diol, silicone diol, fluorine diol, and polyolefine diol. These macrodiols can be used alone or in combination of two or more kinds. Among them, polyether diol is preferable.

Examples of the polyether diol include polyoxy-C2-C3-alkylene (ethylene and/or propylene) glycols, such as polyethylene glycol, polypropylene glycol, and/or polyethylene polypropylene glycol (random or block copolymer), which are obtained by addition reaction of alkylene oxide such as ethyleneoxide and/or propylene oxide, for example, using the above-mentioned low-molecular-weight glycol as an initiator.

Examples thereof also include polytetramethylene ether glycol (polyoxybutylene glycol) obtained by ring-opening polymerization of tetrahydrofuran, or other processes.

Preferred examples of the polyether diol include polytetramethylene ether glycol. The use of polytetramethylene ether glycol can improve impact resistance. These polyether diols can be used alone or in combination of two or more kinds.

The glycol is contained in an amount of, for example, 50 parts by weight or less, or preferably 30 parts by weight or less, in 100 parts by weight of the polyol component. The mixing ratio of the glycol to the crosslinking polyol is in the range of, for example, 100/0 to 60/40, or preferably 100/0 to 80/20, in terms of a ratio of the number of equivalents of hydroxyl groups in the crosslinking polyol/the number of equivalents of hydroxyl groups in the glycol.

Although additives to be described later or the like are mixed with the polyol component according to the purposes and applications, the above-mentioned crosslinking polyol and the glycol, which is contained as required, is/are substantially contained as main components. Such polyol component may be preliminarily prepared, for example, by appropriately mixing a crosslinking polyol and, if necessary, a glycol. Alternatively, the crosslinking polyol and the glycol can be mixed individually during molding of the optical polyurethane resin of the present invention to be described later.

The optical polyurethane resin of the present invention can be obtained by allowing the above-mentioned polyisocyanate component and the above-mentioned polyol component to react.

The mixing ratio of the polyisocyanate component to the polyol component is not particularly limited, and is adjusted so that the optical polyurethane resin thus obtained has an average molecular weight between crosslinking points in the range of, for example, 150 to 400, or preferably 150 to 300.

The average molecular weight between crosslinking points can be determined by the following equation (3).

$$\text{(Weight of NCO component+weight of OH component)/total number of equivalents of average hydroxyl group in polyol having a functionality of more than 2} \qquad (3)$$

NCO component: Polyisocyanate component

OH component: Polyol component

When the average molecular weight between crosslinking points in the optical polyurethane resin is set in the above range, heat resistance and impact resistance can be well-balanced.

The polyisocyanate component and the polyol component can be allowed to react according to a method of molding casting polyurethane, such as one shot method and prepolymer method.

In the one shot method, for example, the polyisocyanate component and the polyol component are prepared (mixed) at such a ratio that the equivalent ratio (equivalent ratio of NCO/OH) of the isocyanate group in the polyisocyanate component to the hydroxyl group in the polyol component is in the range of, for example, 0.5 to 2.0, or preferably 0.75 to 1.25, the mixture is then injected into a mold, and curing reaction is performed at a temperature in the range of, for example, room temperature to 150° C., or preferably room temperature to 120° C., for example, for 10 minutes to 72 hours, or preferably for 4 to 24 hours. The curing temperature may be constant, or can also be gradually increased or cooled.

In the curing reaction, the polyisocyanate component and/or the polyol component is/are preferably warmed to have a low viscosity and then mixed. Thereafter, the mixture is defoamed as required, and then injected into a preheated mold.

After the mixture is injected into the mold and subjected to reaction, the reactant is unmolded, so that an optical polyurethane resin molded into a desired shape can be obtained. After unmolding, if necessary, the optical polyurethane resin can be aged at room temperature within about 7 days.

Alternatively, in the prepolymer method, for example, first, the isocyanate component and a part of the polyol component are allowed to react to thereby synthesize an isocyanate group-terminated prepolymer having an isocyanate group at its molecular terminal. Then, the isocyanate group-terminated prepolymer thus obtained is allowed to react with the remainder of the polyol component to perform curing reaction.

The isocyanate group-terminated prepolymer is synthesized in the following manner. The polyisocyanate component and a part of the polyol component are prepared (mixed) at such a ratio that the equivalent ratio (equivalent ratio of NCO/OH) of the isocyanate group in the polyisocyanate component to the hydroxyl group in the part of the polyol component is in the range of, for example, 1.1 to 20, or preferably 1.5 to 10, and the mixture is allowed to react in a reaction vessel at a temperature in the range of, for example, room temperature to 150° C., or preferably 50 to 120° C., for example, for 0.5 to 18 hours, or preferably for 2 to 10 hours. In this reaction, a known urethanizing catalyst such as organic metal catalyst and amine catalyst may be added as required. Moreover, after completion of the reaction, if desired, unreacted cyclic polyisocyanate can also be removed from the resultant product by a known removal means such as distillation or extraction.

The isocyanate group-terminated prepolymer thus obtained has an isocyanate equivalent of, for example, 80 to 2000, or preferably 100 to 1000, and a viscosity of the prepolymer at the temperature at which the resin is injected into the mold after mixing, of, for example, 10 to 10,000 mPa·s, or preferably 10 to 5,000 mPa·s.

Next, the obtained isocyanate group-terminated prepolymer and the remainder of the polyol component are allowed to react by preparing (mixing) the isocyanate group-terminated prepolymer and the remainder of the polyol component at such a ratio that the equivalent ratio (equivalent ratio of NCO/OH) of the isocyanate group in the isocyanate group-terminated prepolymer to the hydroxyl group in the remainder of the polyol component is in the range of, for example, 0.5 to 2.0, or preferably 0.75 to 1.25, injecting the mixture into a mold, and then performing curing reaction at a temperature in the range of, for example, room temperature to 150° C., or preferably room temperature to 120° C., for example, for 5 minutes to 72 hours, or preferably for 1 to 24 hours.

In the curing reaction, the isocyanate group-terminated prepolymer and/or the remainder of the polyol component is/are preferably warmed to have a low viscosity and then mixed. Thereafter, the mixture is defoamed as required, and then injected into a preheated mold.

After the mixture is injected into the mold and subjected to curing reaction, the reactant is unmolded, so that an optical polyurethane resin molded into a desired shape can be obtained. After unmolding, if necessary, the optical polyurethane resin can also be aged at room temperature within about 7 days.

When the optical polyurethane resin thus obtained is used for polarizing lenses or the like, for example, insert molding can also be performed in the above-mentioned molding method, specifically, after a polarizing film or the like is preliminarily set in a mold, the mixed raw material (the polyisocyanate component and the polyol component) is injected thereinto.

The optical polyurethane resin thus obtained can be handled at relatively low temperature (50° C. or less) during molding, and has a long pot life after injection into the mold and is excellent in moldability. In addition, such resin has excellent optical characteristics such as transparency, color tone, and striae, as well as excellent mechanical properties such as impact resistance even compared with conventional thiol resins.

More specifically, the optical polyurethane resin has little thermal deformation at 50° C. for heat resistance, has a hardness of 30 to 100 in terms of the hardness (HSD) of JIS K7312-1996 for mechanical properties, and can be evaluated as excellent in impact resistance by falling ball test.

In addition, as for optical characteristics, the optical polyurethane resin has a haze value of 0.5 or less, or preferably 0.3 or less, being colorless tone, and it is difficult to visually observe striae therein.

For this reason, the optical polyurethane resin can be suitably used as an optical polyurethane resin satisfying a practical level of optical characteristics and excellent in mechanical properties such as heat resistance and impact resistance, for optical lenses such as transparent lenses, sunglass lenses, and polarizing lenses; and optical components such as protective glasses, hoods, protective shields, automotive safety components, and lighting components.

Known additives such as internal release agent, plasticizer, antifoaming agent, leveling agent, flatting agent, fire retardant, thixotropic agent, tackifier, thickening agent, lubricant, antistatic agent, surfactant, reaction retardant, dehydrator, antioxidant, ultraviolet absorber, hydrolysis inhibitor, and weathering stabilizer can be appropriately mixed in the optical polyurethane resin composition or the optical polyurethane resin if desired.

For example, in the case of mixing an internal release agent, in the above-mentioned molding method, when the mixed raw material (the polyisocyanate component and the polyol component) is injected into a mold, an internal release agent preferably warmed is injected together with the mixed raw material into the mold at a ratio of, for example, 0.01 to 10 parts by weight, or preferably 0.1 to 5 parts by weight, per 100 parts by weight of the total amount of the polyol component and the polyisocyanate component.

Examples of the internal release agent include phosphate release agent, alkyl phosphate release agent, and fatty acid ester-based release agent. Among them, a phosphate release agent is preferable. The mixing of the internal release agent allows easy release from the mold and can provide an optical polyurethane resin with good transparency and a low haze value.

EXAMPLES

The present invention will now be described in detail by way of Examples and Comparative Examples. In the following examples, the units "%" and "part(s)" are by weight.

1) Preparation of Polyol Component

Preparation Example 1

Preparation of Polyol Component A

Added were 936 parts by weight of polycaprolactone polyol (PLACCEL 303 manufactured by Daicel Chemical Industries Ltd.) having an average hydroxyl value of 539.4 mg KOH/g and an average functionality of 3.0 and 311 parts by weight of polytetramethylene ether glycol (PTG-650SN manufactured by Hodogaya Chemical Co., Ltd.) having an average hydroxyl value of 169.5 mg KOH/g. The mixture was then stirred at 110° C. for 2 hours with bubbling nitrogen (at a flow rate of 10 L/min), and subsequently was dehydrated to obtain a polyol component A.

Preparation Example 2

Preparation of Polyol Component B

Added were 936 parts by weight of polycaprolactone polyol (PLACCEL 303 manufactured by Daicel Chemical Industries Ltd.) having an average hydroxyl value of 539.4 mg KOH/g and an average functionality of 3.0 and 125 parts by weight of polytetramethylene ether glycol (TERATHANE 250 manufactured by Invista) having an average hydroxyl value of 448.8 mg KOH/g. The mixture was then stirred at 110° C. for 2 hours with bubbling nitrogen (at a flow rate of 10 L/min), and subsequently was dehydrated to obtain a polyol component B.

Preparation Example 3

Preparation of Polyol Component C

Added were 998 parts by weight of polycaprolactone polyol (PLACCEL 303 manufactured by Daicel Chemical Industries Ltd.) having an average hydroxyl value of 539.4 mg KOH/g and an average functionality of 3.0 and 200 parts by weight of polytetramethylene ether glycol (PTG-1000 manufactured by Hodogaya Chemical Co., Ltd.) having an average hydroxyl value of 112.2 mg KOH/g. The mixture was then stirred at 110° C. for 2 hours with bubbling nitrogen (at a flow rate of 10 L/min), and subsequently was dehydrated to obtain a polyol component C.

Preparation Example 4

Preparation of Polyol Component D

Added were 959 parts by weight of polyether polyol (initiator: sorbitol/glycerin, Actcol GR16A manufactured by Mitsui Chemicals Polyurethanes, Inc.) having an average hydroxyl value of 550 mg KOH/g and an average functionality of 3.8 and 199 parts by weight of polytetramethylene ether glycol (PTG-650SN manufactured by Hodogaya Chemical Co., Ltd.) having an average hydroxyl value of 169.5 mg KOH/g. The mixture was then stirred at 110° C. for 2 hours with bubbling nitrogen (at a flow rate of 10 L/min), and subsequently was dehydrated to obtain a polyol component D.

Preparation Example 5

Preparation of Polyol Component E

While nitrogen was bubbled (at a flow rate of 10 L/min), 868 parts by weight of polyether polyol (initiator: trimethylolpropane, Actcol IR-94 manufactured by Mitsui Chemicals Polyurethanes, Inc.) having an average hydroxyl value of 920 mg KOH/g and an average functionality of 3.0 was stirred at 110° C. for 2 hours, and subsequently was dehydrated to obtain a polyol component E.

Preparation Example 6

Preparation of Polyol Component F

Added were 517 parts by weight of polyether polyol (initiator: sucrose/glycerin, Actcol GR84 manufactured by Mitsui Chemicals Polyurethanes, Inc.) having an average hydroxyl value of 450 mg KOH/g and an average functionality of 4.4 and 72 parts by weight of polytetramethylene ether glycol (PTG-650SN manufactured by Hodogaya Chemical Co., Ltd.) having an average hydroxyl value of 169.5 mg KOH/g. The mixture was then stirred at 110° C. for 2 hours with bubbling nitrogen (at a flow rate of 10 L/min), and subsequently was dehydrated to obtain a polyol component F.

Preparation Example 7

Preparation of Polyol Component G

Added were 433 parts by weight of polycaprolactone polyol (PLACCEL 308 manufactured by Daicel Chemical Industries Ltd.) having an average hydroxyl value of 288 mg KOH/g and an average functionality of 3.0 and 332 parts by weight of polytetramethylene ether glycol (PTG-650SN manufactured by Hodogaya Chemical Co., Ltd.) having an average hydroxyl value of 169.5 mg KOH/g. The mixture was then stirred at 110° C. for 2 hours with bubbling nitrogen (at a flow rate of 10 L/min), and subsequently was dehydrated to obtain a polyol component G.

Preparation Example 8

Preparation of Polyol Component H

While nitrogen was bubbled (at a flow rate of 10 L/min), 800 parts by weight of polytetramethylene ether glycol (TERATHANE 250 manufactured by Invista) having an average hydroxyl value of 448.8 mg KOH/g was stirred at 110° C. for 2 hours, and subsequently was dehydrated to obtain a polyol component H.

Preparation Example 9

Preparation of Polyol Component I

A trimethylolpropane having an average hydroxyl value of 1250 mg KOH/g and an average functionality of 3.0, which was generally used in casting polyurethane, was determined as a polyol component I.

Preparation Example 10

Preparation of Polyol Component J

Added were 502 parts by weight of polyether polyol (initiator: sucrose/glycerin, Actcol 52-460 manufactured by Mitsui Chemicals Polyurethanes, Inc.) having an average hydroxyl value of 460 mg KOH/g and an average functionality of 5.3 and 87 parts by weight of polytetramethylene ether glycol (PTG-650SN manufactured by Hodogaya Chemical Co., Ltd.) having an average hydroxyl value of 169.5 mg KOH/g. The mixture was then stirred at 110° C. for 2 hours with bubbling nitrogen (at a flow rate of 10 L/min), and subsequently was dehydrated to obtain a polyol component J.

Preparation Example 11

Preparation of Polyol Component K

While nitrogen was bubbled (at a flow rate of 10 L/min), 993 parts by weight of polytetramethylene ether glycol (PTG-650SN manufactured by Hodogaya Chemical Co., Ltd.) having an average hydroxyl value of 169.5 mg KOH/g was stirred at 110° C. for 2 hours. Subsequently, 45 parts by weight of trimethylolpropane having an average hydroxyl value of 1250 mg KOH/g and an average functionality of 3.0 and 801 parts by weight of 4,4'-methylenebis(2-chloroaniline) (CUAMINE-MT manufactured by Ihara Chemical Industry Co., Ltd.) were added thereto to obtain a polyol component K.

Preparation Example 12

Preparation of Isocyanate Group-Terminated Prepolymer A

To a 2-liter five-necked round flask equipped with a thermometer, a stirrer, a nitrogen introducing tube, and a Dimroth were added 45 parts by weight of polycaprolactone polyol (PLACCEL 303 manufactured by Daicel Chemical Industries Ltd.) having an average hydroxyl value of 539.4 mg KOH/g and an average functionality of 3.0 and 16 parts by weight of polytetramethylene ether glycol (PTG-650SN manufactured by Hodogaya Chemical Co., Ltd.) having an average hydroxyl value of 169.5 mg KOH/g. The mixture was then stirred at 110° C. for 2 hours with bubbling nitrogen (at a flow rate of 10 L/min), and subsequently was dehydrated. Thereafter, 939 g of $H_6XDI$ (TAKENATE 600 manufactured by Mitsui Chemicals Polyurethanes, Inc.) was supplied thereinto, and allowed to react at 90° C. for 4 hours to obtain an isocyanate group-terminated prepolymer A. The isocyanate group-terminated prepolymer A thus obtained was clear colorless and had an NCO content of 38.6% (108.8 equivalents).

Examples and Comparative Examples

In a general casting method, as shown in Table 1, using $H_6XDI$, NBDI, $H_{12}MDI$, TDI (tolylene diisocyanate), or the isocyanate group-terminated prepolymer A as base component and using each of the polyol components A to K as curing agent, a base component, a curing agent, and an internal release agent (see below) were formulated as shown in Table 1, and an optical polyurethane resin in each of Examples and Comparative Examples was formed.

In Table 1, the internal release agents mixed in each of Examples and Comparative Examples are as follows. Moreover, in Table 1, the amount of the internal release agent added is represented by the number of parts by weight per 100 parts by weight of the total amount of the base component and the curing agent.

Internal mold release agent A: Phosphate release agent (ZELEC UN manufactured by Stepan Company)

Internal mold release agent B: Phosphate release agent (Mold Wiz INT-1846N2 manufactured by AXEL Plastics Research Laboratories)

Internal mold release agent C: Phosphate release agent (Mold Wiz INT-1681OG manufactured by AXEL Plastics Research Laboratories)

Internal mold release agent D: Mixture of 20 g of phosphate release agent (Mold Wiz INT-1846N2) and 20 g of phosphate release agent (Mold Wiz INT-1681OG)

Internal mold release agent E: 10 g of phosphate release agent (ZELEC UN) and 40 g of phosphate release agent (Mold Wiz INT-1681OG)

More specifically, first, the base component was warmed to 40° C., the curing agent was warmed to 40° C. and the internal release agent was warmed to 40° C. Then, the base component, curing agent, and internal release agent thus warmed were supplied into a mixing pot, which was kept warm at 40° C., at such a ratio that the NCO/active hydrogen group (OH and $NH_2$) equivalent ratio was 1.0. After completion of the mixing, the mixture was defoamed for 2 minutes.

Thereafter, the mixture of the base component, the curing agent, and the internal release agent was injected into a mold preheated to 40° C. After completion of the injection, the injected mixture was cured at 50° C. for 24 hours, followed by curing at 100° C. for another 24 hours, and finally unmolded. Therefore, an optical polyurethane resin (cured product) formed in each of Examples and Comparative Examples was obtained.

Evaluation

1) Mold Injectability

In the above-mentioned forming, the ease of injection at the time when 20 g of the mixture in each of Examples and Comparative Examples was injected into the preheated mold (3 mm of clearance, 147R) was evaluated by the following criteria. The results are shown in Table 1.

A: The injection was completed within 1 minute without involving foams.

B: The mixture was difficult to inject because of rapid thickening.

2) Pot Life

In the above-mentioned forming, the time required for the mixture at 40° C. to reach 100,000 mPa·s was measured as pot life (minute) in each of Examples and Comparative Examples. The results are shown in Table 1.

3) Hardness

In accordance with hardness test of JIS K7312-1996, the hardness (HSD) of the cured product in each of Examples and Comparative Examples was measured. The results are shown in Table 1.

4) Transparency (Haze Value)

In each of Examples and Comparative Examples, a 3-mm-thick cured product was measured with a haze meter (manufactured by Nippon Denshoku Industries Co., Ltd., NDH2000). The results are shown in Table 1.

5) Striae

In each of Examples and Comparative Examples, a 3-mm-thick cured product was visually observed, and the presence or absence of striae was evaluated according to the following criteria. The results are shown in Table 1.

A: No striae were observed.

B: Striae were observed in the entire cured product.

6) Heat Resistance

In each of Examples and Comparative Examples, when the cured product was put into a dryer at 50° C. and then taken out therefrom after one hour, the change in appearance of the cured product was visually observed, and heat resistance was then evaluated according to the following criteria. The results are shown in Table 1.

A: No deformation from the initial shape of the cured product was observed.

B: A deformation from the initial shape of the cured product was observed.

7) Impact Resistance (Falling Ball Test)

A falling ball test was carried out in accordance with the technique described in FDA standards (1972) concerning impact resistance of spectacle lenses. Specifically, after a steel ball was dropped from a height of 127 cm on the cured product of each of Examples and Comparative Examples, the cured product was visually observed for any change in appearance, and the impact resistance was evaluated according to the following criteria. The results are shown in Table 1.

A: Although the steel ball weighing 642 g was dropped, no change was observed in the appearance of the cured product.

B: After the steel ball weighing 642 g was dropped, damage on the surface of the cured product or a crack in the cured product was observed.

C: After the steel ball weighing 642 g was dropped, a crack in the cured product was observed.

TABLE 1

|  | Ex. 1 | Ex. 2 | Ex. 3 | Ex. 4 | Ex. 5 |
| --- | --- | --- | --- | --- | --- |
| Base Component | $H_6XDI$ | $H_6XDI$ | $H_6XDI$ | $H_6XDI$ | $H_6XDI$ |
| Curing Agent | Polyol Component A | Polyol Component B | Polyol Component C | Polyol Component D | Polyol Component E |
| Release Agent | Release Agent A | Release Agent B | Release Agent C | Release Agent D | Release Agent E |
| Amount of Release Agent Added | 0.5 | 0.5 | 2 | 2 | 4 |

TABLE 1-continued

|  |  | | | | | |
|---|---|---|---|---|---|---|
| Polyol Component | Average Hydroxyl Value | 442 | 529 | 468 | 484 | 920 |
|  | Average Functionality | 2.9 | 2.9 | 2.96 | 3.7 | 3 |
|  | Number Average Molecular Weight | 368 | 307 | 355 | 429 | 183 |
| Average Molecular Weight Between Crosslinking Points | | 245 | 223 | 244 | 228 | 155 |
| Mold Injectability | | A | A | A | A | A |
| Pot Life (min) | | >60 | >60 | >60 | >60 | >60 |
| Hardness (HSD) | | 82 | 84 | 80 | 85 | 88 |
| Haze Value | | 0.3 | 0.4 | 0.3 | 0.4 | 0.3 |
| Striae | | A | A | A | A | A |
| Heat Resistance | | A | A | A | A | A |
| Impact Resistance | | A | A | A | A | B |

|  | Ex. 6 | Ex. 7 | Ex. 8 | Ex. 9 |
|---|---|---|---|---|
| Base Component | H₆XDI | Prepolymer A | NBDI | H₁₂MDI |
| Curing Agent | Polyol Component F | Polyol Component A | Polyol Component A | Polyol Component A |
| Release Agent | Release Agent A | Release Agent B | Release Agent C | Release Agent D |
| Amount of Release Agent Added | 0.5 | 0.5 | 2 | 2 |
| Polyol Component — Average Hydroxyl Value | 416 | 442 | 442 | 442 |
| Average Functionality | 4.28 | 2.9 | 2.9 | 2.9 |
| Number Average Molecular Weight | 578 | 368 | 368 | 368 |
| Average Molecular Weight Between Crosslinking Points | 241 | 251 | 255 | 287 |
| Mold Injectability | A | A | A | A |
| Pot Life (min) | >60 | >60 | >60 | >60 |
| Hardness (HSD) | 84 | 82 | 83 | 85 |
| Haze Value | 0.3 | 0.3 | 0.4 | 0.4 |
| Striae | A | A | A | A |
| Heat Resistance | A | A | A | A |
| Impact Resistance | B | A | A | A |

|  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Base Component | H₆XDI | H₆XDI | H₆XDI | H₆XDI | TDI | H₁₂MDI |
| Curing Agent | Polyol Component G | Polyol Component H | Polyol Component I | Polyol Component J | Polyol Component A | Polyol Component K |
| Release Agent | Release Agent A | Release Agent B | Release Agent C | Release Agent D | Release Agent E | Release Agent A |
| Amount of Release Agent Added | 0.5 | 0.5 | 2 | 2 | 2 | 0.5 |
| Polyol Component — Average Hydroxyl Value | 184 | 449 | 1247 | 416 | 442 | 305*[1] |
| Average Functionality | 2.6 | 2 | 3 | 5.1 | 2.9 | 2.1 |
| Number Average Molecular Weight | 793 | 250 | 135 | 689 | 368 | 386 |
| Average Molecular Weight Between Crosslinking Points | 665 | — | 142 | 243 | 237 | 2779 |
| Mold Injectability | A | A | B | A | B | A |
| Pot Life (min) | >60 | >60 | — | >60 | 5 | >60 |
| Hardness (HSD) | 45 | 70 | Cured product not obtained due to defective molding. | — | Cured product not obtained due to defective molding. | 82 |
| Haze Value | 0.3 | 0.4 |  | 0.3 |  | 0.5 |
| Striae | A | A |  | A |  | B |
| Heat Resistance | B | B |  | A |  | A |
| Impact Resistance | A | A |  | C |  | A |

*[1]Average active hydrogen equivalent (hydroxyl equivalent + amine equivalent)

While the illustrative embodiments of the present invention are provided in the above description, such is for illustrative purpose only and it is not to be construed restrictively. Modification and variation of the present invention that will be obvious to those skilled in the art is to be covered by the following claims.

INDUSTRIAL APPLICABILITY

The optical polyurethane resin composition and the optical polyurethane resin according to the present invention are suitable for optical lenses and optical components.

The invention claimed is:

1. A composition for producing an optical casting polyurethane resin, the composition consisting of:
   a polyisocyanate component comprising at least one cyclic polyisocyanate selected from the group consisting of alicyclic polyisocyanates, and aralkyl polyisocyanates; and
   a polyol component,
   wherein the polyol component comprises a combination of a crosslinking polyol having an average hydroxyl value of 150 to 1300 mg KOH/g and an average functionality of 2.5 or more and 5 or less, and a polytetramethylene ether glycol having an average hydroxyl value of 70 to 500 mg KOH/g;

wherein the optical casting polyurethane resin obtained by a reaction of the polyisocyanate component and the polyol component has an average molecular weight between crosslinking points in a range of 150 to 400.

2. An optical casting polyurethane resin obtained from a composition for producing an optical casting polyurethane resin, the composition for producing an optical casting polyurethane resin consisting of:

a polyisocyanate component comprising at least one cyclic polyisocyanate selected from the group consisting of alicyclic polyisocyanates, and aralkyl polyisocyanates, and a polyol component, wherein the polyol component comprises a combination of a crosslinking polyol having an average hydroxyl value of 150 to 1300 mg KOH/g and an average functionality of 2.5 or more and 5 or less, and a polytetramethylene ether glycol having an average hydroxyl value of 70 to 500 mg KOH/g, and the optical casting polyurethane resin is obtained from the composition for producing an optical casting polyurethane resin, by allowing the polyisocyanate component and the polyol component to react.

3. The optical casting polyurethane resin according to claim 2, having a haze value of 0.5 or less.

* * * * *